Figure 1:
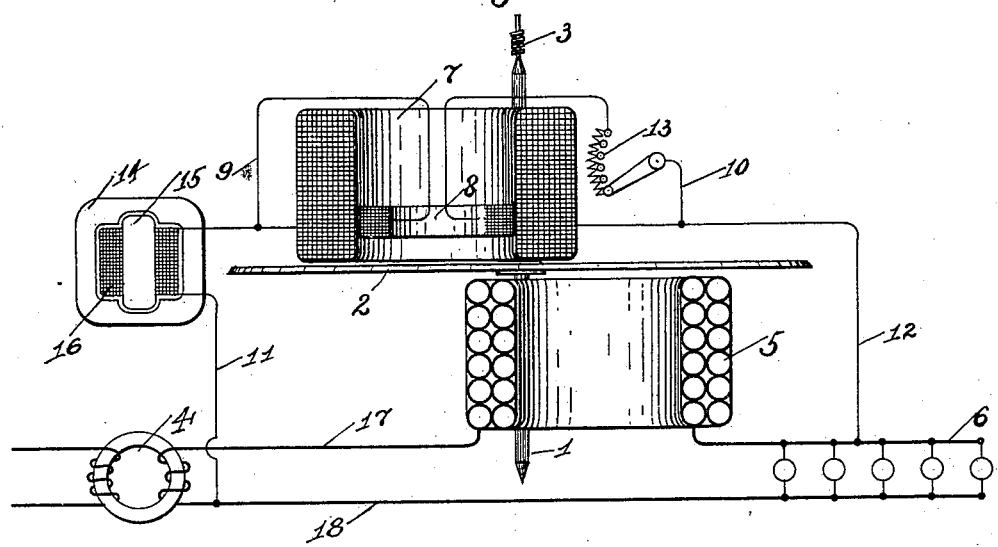

No. 698,693. Patented Apr. 29, 1902.
T. DUNCAN.
ELECTRIC METER.
(Application filed Mar. 1, 1901.)

(No Model.) 4 Sheets—Sheet 1.

Witnesses:
Milton M. Alexander.
Max W. Zabel.

Inventor:
Thomas Duncan.
By Charles A. Brown & Cragg
Attorneys.

No. 698,693.  
T. DUNCAN.  
ELECTRIC METER.  
(Application filed Mar. 1, 1901.)  
(No Model.)  
Patented Apr. 29, 1902.  
4 Sheets—Sheet 2.

Witnesses.  
Milton M. Alexander  
Max M. Zabel

Inventor:  
Thomas Duncan  
By Charles A. Brown & Cragg  
Attorneys.

No. 698,693. Patented Apr. 29, 1902.
T. DUNCAN.
ELECTRIC METER.
(Application filed Mar. 1, 1901.)
(No Model.) 4 Sheets—Sheet 3.
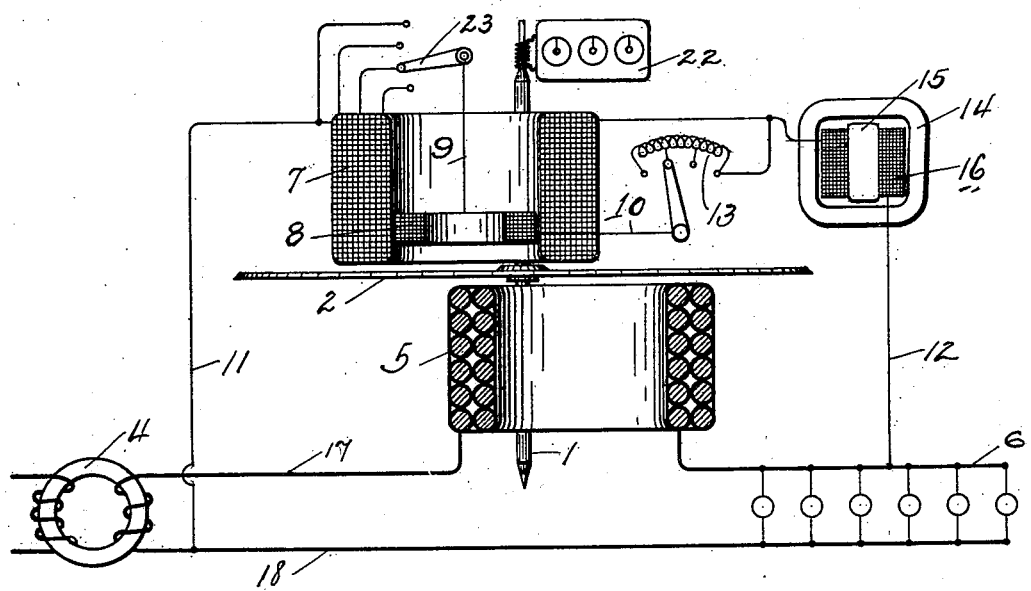
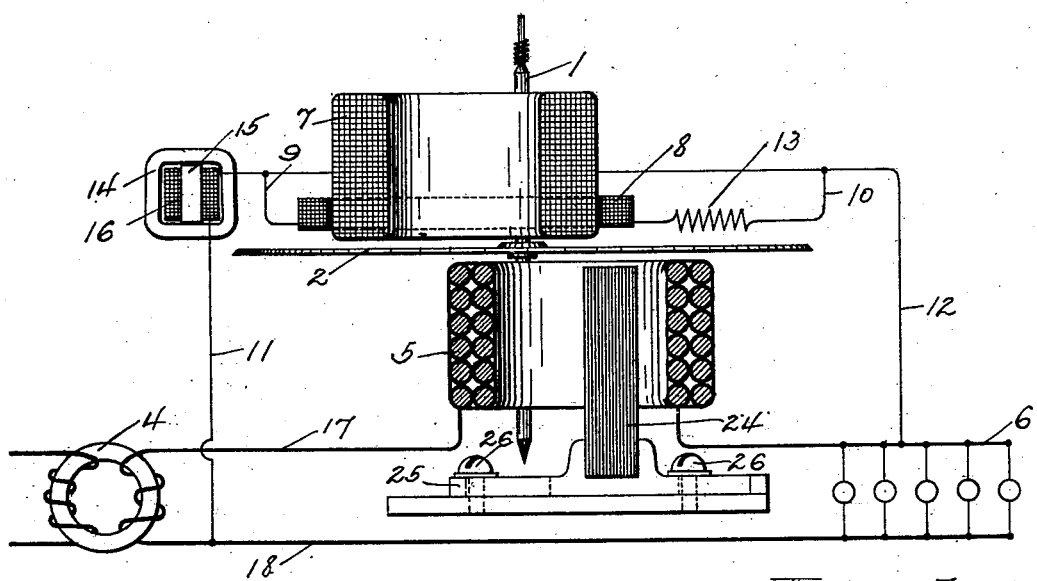
Witnesses.
Milton M. Alexander.
Inventor:
Thomas Duncan.
By Charles A. Brown & Cragg
Attorneys.

No. 698,693. Patented Apr. 29, 1902.
T. DUNCAN.
ELECTRIC METER.
(Application filed Mar. 1, 1901.)
(No Model.) 4 Sheets—Sheet 4.

Witnesses:
Milton M. Alexander
Max W. Zabel

Inventor
Thomas Duncan
By Charles A. Brown & Cragg
Attorneys

United States Patent Office.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,693, dated April 29, 1902.

Original application filed April 11, 1898, Serial No. 677,110. Divided and this application filed March 1, 1901. Serial No. 49,394. (No model.)

*To all whom it may concern:*

Be it known that I, THOMAS DUNCAN, a citizen of the United States, residing at Chicago, in the county of Cook and State of Illinois, have invented a certain new and useful Improvement in Electric Meters, (Case No. 44ª,) of which the following is a full, clear, concise, and exact description, reference being had to the accompanying drawings, forming a part of this specification.

My invention relates to integrating motor-meters employing field portions in inductive relation to armatures and adapted particularly for measuring alternating currents, my present application being a division of my application, No. 677,110, filed April 11, 1898.

It is well known that accurate measurement of the energy of alternating-current systems of distribution possessing inductance requires that the magnetic field representing the electromotive force be in quadrature with the said electromotive force. Various methods of securing a magnetic field in quadrature with the line electromotive force have been devised, some of which are unstable and unreliable in operation because of their susceptibility to changes in periodicity, pressure, and temperature.

The object of my present invention is to provide a reliable and efficient method of measuring inductive loads by securing in the energizing-coil which represents the line-pressure a magnetic field in quadrature with such pressure.

In accordance with my invention I employ a series or current field-winding associated with the circuit to produce a field proportioned to the current, a closed revoluble armature in inductive relation to said winding, a volt or pressure coil associated with the system to produce a field proportioned to the pressure, and an auxiliary coil preferably in parallel with the pressure-winding and acting in coöperation therewith, the auxiliary coil being also in inductive relation to the armature, a suitable registering or measuring mechanism being operated by the armature.

I will describe my invention more fully by reference to the accompanying drawings, illustrating several embodiments thereof, in which—

Figure 2:
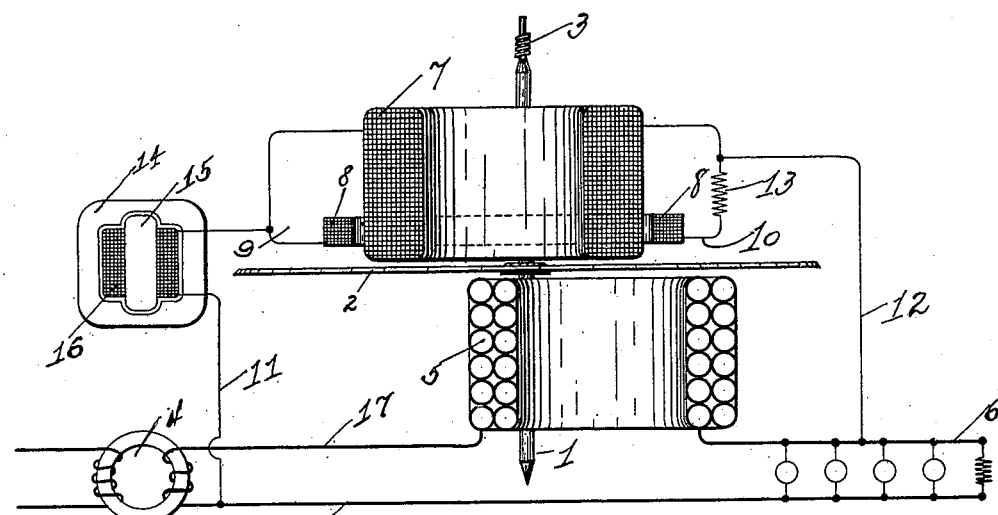
Figure 9:
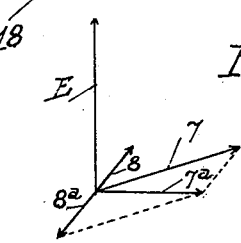
Figure 3:
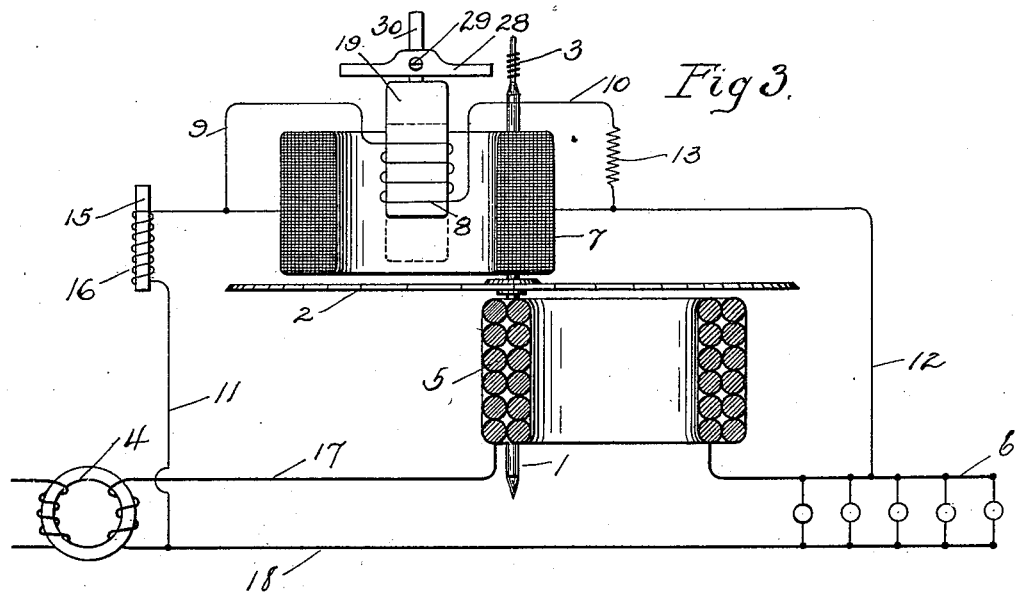
Figure 4:
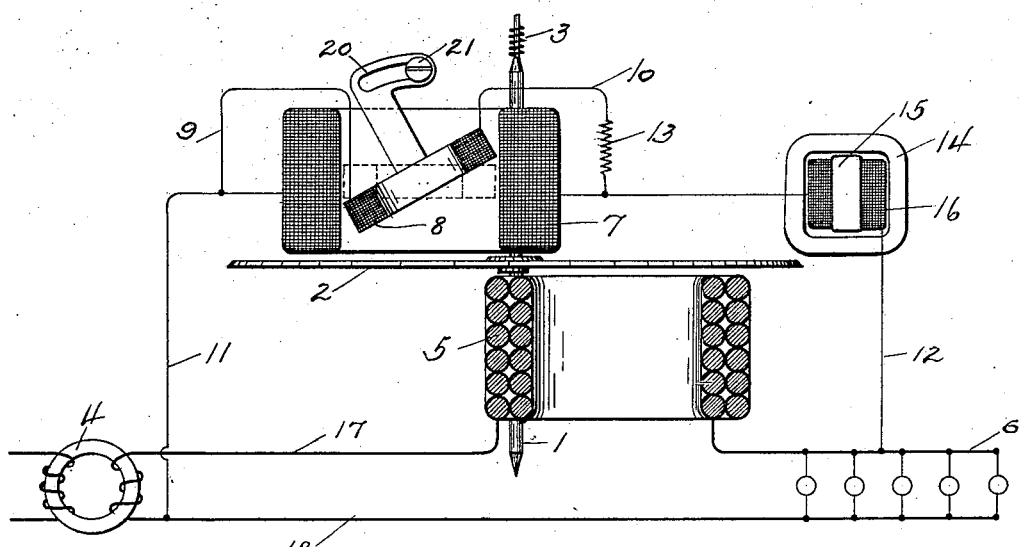
Figure 7:
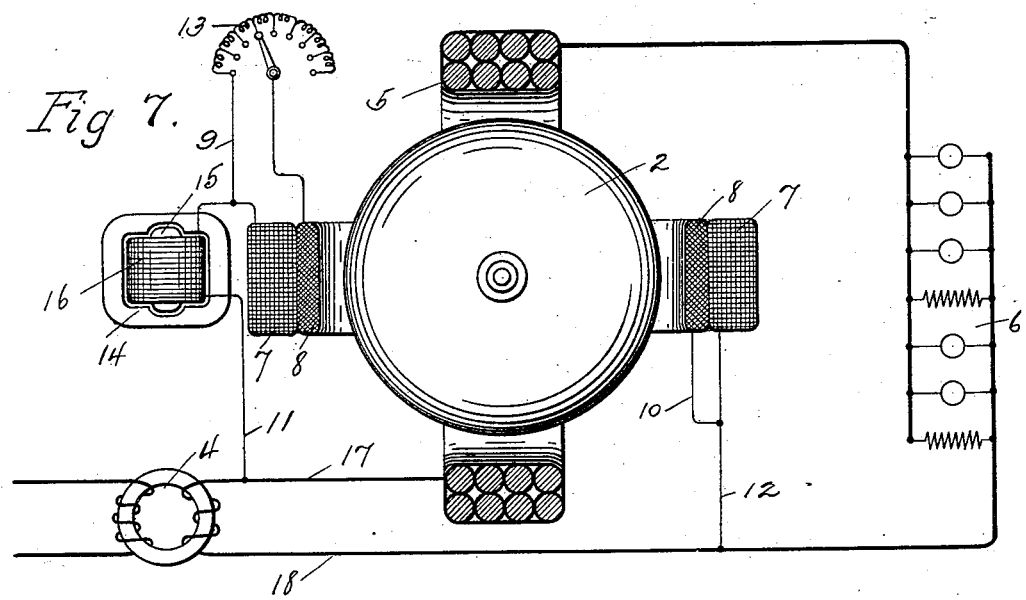
Figure 8:
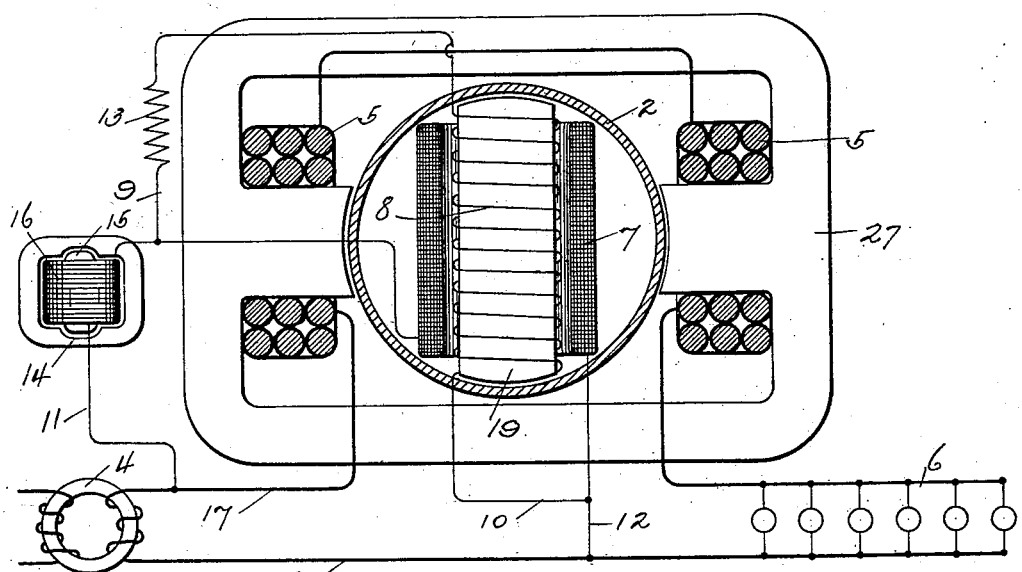

Figure 1 is a side view of my improved meter, with the energizing-coils taken in vertical central section, showing their relative arrangements. Fig. 2 is a view similar to Fig. 1, with the auxiliary coil arranged outside of the volt-coil. Fig. 3 illustrates a meter constructed in accordance with the invention with the auxiliary coil mounted upon an iron core adapted for vertical adjustment within the main pressure coil or winding. Fig. 4 is a view of a modified form of meter in which the auxiliary volt coil or winding is provided with an adjustment whereby its magnetic axis may be placed at any desired angle with respect to the main pressure-winding. Fig. 5 is a view similar to Fig. 1, showing the addition of switching means whereby the number of effective turns of the main pressure-winding may readily be adjusted. Fig. 6 is a view similar to Fig. 2, showing the addition of an iron core inclosed by the series field-coil. Fig. 7 shows a modified form of meter wherein a cylinder is employed as the armature. Fig. 8 shows a meter wherein the field-coils are mounted upon an iron core, the main pressure-winding and the auxiliary pressure-winding inclosing the core within the cylindrical armature, the armature and energizing-coils being shown in transverse section. Fig. 9 is a phase and vector diagram to illustrate the electrical principles involved.

Like parts are indicated by similar characters of reference throughout the different views.

The upright revoluble armature spindle or shaft 1 is properly supported in suitable bearings in the usual or other proper manner and carries upon its upper end a worm 3, adapted for a meshing engagement with a proper registering mechanism 22. At a suitable point on said spindle is rigidly fixed either a disk metallic armature, as shown in Figs. 1 to 6, inclusive, or a cylindrical form of armature, as shown in Figs. 7 and 8, the said armature being preferably of aluminium.

Referring now to those views showing a disk form of armature, in close proximity to the lower face of said armature are arranged the series field or ampere coils 5, connected with the generator 4, which supplies the translating devices in the work-circuit 6 through the main leads 17 and 18. The current flowing through this field-coil sets up a magnetic field proportional to said current. Upon the opposite side of said armature is arranged a volt or pressure coil 7, whose magnetic axis is parallel with but not concentric with the magnetic axis of the said series field-coil 5. The said volt-coil 7 receives its current from the mains 17 and 18 by being connected therewith in multiple with the wires 11 and 12. An auxiliary phase-changing coil 8 is used in mutual and coaxial relation with the said volt-coil 7 and receives its current preferably by conduction from the wires 9 and 10, which are connected in multiple to the terminals of the said volt-coil 7. This auxiliary coil may be arranged in coaxial relation with the said volt-coil either within or without the same, as shown, or it may be made adjustable within the volt-coil by means of a lever-arm 20, having upon its free outer end a slotted head and adapted for a lateral adjustment upon the fixed set-screw 21, whereby the magnetic axis of the said auxiliary coil can be readily and conveniently adjusted to any desired angle with the axis of the volt-coil. By this construction a slight starting torque can be imparted to the said armature for the purpose of overcoming the friction and inertia incident to starting on small loads.

The auxiliary coil 8 may be provided with an iron core 19, Figs. 3 and 8, and it may be arranged coaxially with said volt-coil and within the cylindrical armature, as shown in Fig. 8.

Any suitable means for adjusting the iron core 19, Fig. 3, may be employed, such as that shown by a support 28, rod 30, and set-screw 29.

An impedance-coil 16 is wound upon a straight core 15 and properly secured inside of the surrounding envelop 14. This construction is easily made and readily assembled and gives the best impeding effect.

The envelop 14 may be provided upon two of its opposite inner edges with vertical recesses to receive the corresponding polar ends of the core 15, which is then somewhat longer than the width of the coil 16. The core 15 and the envelop 14 are made from iron punchings and are held together in any suitable manner. The impedance-coil 16 is connected in series with the said volt-coil and receives its currents from the mains 17 and 18 by being connected therewith in multiple with the wires 11 and 12, and the coil 8 receives its currents by conduction from the wires 9 and 10, which are connected in multiple to the terminals of the said volt-coil. A resistance 13 is shown arranged in circuit with the said coil 8 and its leads 9 and 10. A contact-switch 23 may be provided, Fig. 5, which is connected in series with the auxiliary coil 8 and by means of which the said coil 8 is connected to different portions or windings of the volt-coil.

In Fig. 6 is shown a vertically-arranged iron core 24, rigidly fixed upon a plate 25, having its opposite ends longitudinally slotted to admit the respective set-screws 26. The plate 25 is thus adapted for a longitudinal sliding adjustment upon its support. The function of this core 24 is to enable the meter to start on very small loads by imparting an auxiliary or starting torque to the revoluble armature to overcome the incidental friction and inertia.

The action and manner of employing the core 24 is as follows: Assuming that no current is traversing the series coil 5, but that a current is traversing the shunt field-coils 7 and 8, the resultant magnetism of these coils is diverted laterally toward the iron core 24 and passes through the said disk armature, thereby inducing eddy-currents therein. The said armature is then actuated by the reaction of these eddy-currents upon the field producing them with a speed which can be regulated or varied at pleasure by adjusting said core 24 toward or away from the said coils 7 and 8. In the present instance the speed of the armature is adjusted to overcome the friction and inertia only, as before stated. Obviously the said core 24 can readily be adapted for a vertical instead of a horizontal adjustment, if desired, and the amount of iron in said core can be varied to produce the desired results.

In Fig. 8 the field-coils 5 are shown as mounted upon the inwardly-projecting and diametrically opposite polar extensions of the iron punching 27, which constitutes a closed type of field. The coils 7 and 8 in this construction are arranged within the cylindrical armature.

Obviously the relative arrangement of the energizing and phase-changing coils may be indefinitely varied without departing from the spirit and scope of my invention.

Briefly stated, the operation of my invention is as follows: When an impulse of current from the generator traverses the coil 5, a magnetic field is set up in said coil which is in phase with the electromotive force of the circuit 17 and 18 when the work-circuit consists of incandescent lamps or other non-inductive translating devices. To have the torque exerted upon the said armature proportional to the real or actual watts when the current in the series coil 5 lags, as where an inductive load is substituted for the said lamps, the magnetic field set up by the volt-coil must be ninety degrees behind the pressure of the circuit 17 and 18 and also ninety degrees behind the magnetism of the series coil 5 when the load is non-inductive. To produce a lag of the current in the volt-coil, the impedance-coil 16 is inserted in series therewith; but for reasons well understood in the art the impedance-coil cannot retard the phase of the current to exactly ninety degrees, but will be somewhat less than quadrature. To obtain quadrature, I employ the auxiliary pressure-coil 8 and shunt it around the volt-coil 7, as described, and by varying the resistance 13, which is in series with the auxiliary coil 8, I combine their respective magnetizing forces into a resultant which is in exact quadrature with the pressure at the terminals of the shunt-leads 11 and 12. This is best understood with reference to Fig. 9, in which the line E represents the impressed electromotive force of the system and also the magnetism of the series field-coil 5 when the load is non-inductive. The line 7 represents the magnetism of the coil 7, which is caused to lag by the impedance-coil 16, connected in series therewith. The line 8 represents the phase and magnetism of the coil 8, which does not lag as much as that of the said coil 7, because its turns are less in number and have a non-inductive resistance 13 in series therewith; but by reversing the turns or convolutions of the said coil 8, so that they oppose the turns of the coil 7, the line $8^a$ will represent their phase relation to the line 7. Then by completing the parallelogram of forces in the usual manner the resultant magnetism of the said coils 7 and 8 is shown by the line $7^a$. By winding the auxiliary coil 8 with resistance-wire and properly proportioning its length of wire and number of turns the said resistance 13 may be dispensed with. The said revoluble armature is actuated by the shifting field established by the series coil 5 and the resultant field of the coils 7 and 8. If the pressure is constant, the speed will be proportional to the current passing through the coil 5, and if the current through the series coil 5 is constant the speed will vary directly as the current through the volt-coil or as the pressure at the terminals of the shunt-wires 11 and 12. If there is no inductance in the work-circuit, the speed of the armature will be proportional to the product of the current values through the coils 5 and 7 or of amperes and volts; but if the load is inductive the speed will be proportional to the product of the pressure and current and the cosine of the phase angle.

Any suitable retarding device in which the retardation varies directly as the speed may be employed to make the speed of the meter proportional to the energy passing through it, such as may be obtained by revolving a metallic disk armature between the poles of a permanent magnet or magnets. Such a magnet or magnets may be adapted to embrace said armature between their poles to obtain the required retardation, if desired.

Having thus described my invention, I claim as new and desire to secure by Letters Patent—

1. The method of producing a magnetic field in quadrature with the line or impressed electromotive force, which consists in lagging a derived current, dividing said current and producing thereby two independent magnetic fields, and combining said magnetic fields to form a resultant magnetic field of the required phase relation, substantially as described.

2. The method of producing motion and regulating the same, which consists in producing a field proportioned to the current, producing two out-of-phase fields by two pressure-windings receiving current independently of each other, subjecting a movable armature to the action of the said fields and effecting a relative adjustment between the windings producing said out-of-phase fields, substantially as described.

In witness whereof I hereunto subscribe my name this 30th day of January, A. D. 1901.

THOMAS DUNCAN.

Witnesses:
CHARLES A. BROWN,
GEORGE L. CRAGG.